(12) United States Patent
Kirkland et al.

(10) Patent No.: US 7,676,462 B2
(45) Date of Patent: Mar. 9, 2010

(54) METHOD, APPARATUS, AND PROGRAM FOR REFINING SEARCH CRITERIA THROUGH FOCUSING WORD DEFINITION

(75) Inventors: Dustin C. Kirkland, Austin, TX (US); David Bruce Kumhyr, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 2118 days.

(21) Appl. No.: 10/324,501

(22) Filed: Dec. 19, 2002

(65) Prior Publication Data
US 2004/0122816 A1 Jun. 24, 2004

(51) Int. Cl.
G06F 17/30 (2006.01)
(52) U.S. Cl. .................. 707/5; 707/1; 707/2; 707/3; 707/4; 707/7; 707/10
(58) Field of Classification Search ............ 707/3, 707/5; 715/514
See application file for complete search history.

(56) References Cited

U.S. PATENT DOCUMENTS

| | | | |
|---|---|---|---|
| 5,546,529 A | 8/1996 | Bowers et al. ............ 395/159 |
| 5,630,125 A * | 5/1997 | Zellweger ............ 707/103 R |
| 5,768,581 A | 6/1998 | Cochran ............ 395/615 |
| 5,838,965 A * | 11/1998 | Kavanagh et al. ....... 707/103 R |
| 5,913,215 A | 6/1999 | Rubinstein et al. ............ 707/10 |
| 5,999,927 A * | 12/1999 | Tukey et al. ............ 707/5 |
| 6,006,225 A | 12/1999 | Bowman et al. ............ 707/5 |
| 6,327,589 B1 | 12/2001 | Blewett et al. ............ 707/5 |
| 6,356,286 B1 | 3/2002 | Lawrence ............ 345/853 |
| 6,374,275 B2 | 4/2002 | Wasilewski ............ 707/530 |
| 6,484,190 B1 | 11/2002 | Cordes et al. ............ 707/514 |

(Continued)

FOREIGN PATENT DOCUMENTS

| | | |
|---|---|---|
| JP | 10260888 A | 9/1998 |
| WO | WO0139038 A1 | 5/2001 |

OTHER PUBLICATIONS

Jaana Kekalainen, "The Effects of Query Complexity, Expansion and Structure on Retrieval Performance in Probabalistic Text Retrieval", 1999, Department of Information Studies—University of Tampere, pp. 1-104.*

(Continued)

*Primary Examiner*—Neveen Abel Jalil
*Assistant Examiner*—Farhan M Syed
(74) *Attorney, Agent, or Firm*—Yee & Associates, P.C.; Jeffrey S. LaBaw (57) ABSTRACT

A search engine is provided that includes a refinement mechanism. The search engine receives and parses a search expression and delimits the expression into individual terms or words. The refinement mechanism includes a directory of related terms and a directory of compound terms. The refinement mechanism also includes a hierarchical data structure of refinement terms. The mechanism then identifies related terms for the individual terms in the search expression, compound terms that may be formed from individual terms in the expression, and terms in the expression that have sub structures or "sub trees" in the hierarchical data structure. An interface is generated in a graphical tree structure to present identified related terms, compound terms, and refinement terms. Based upon user interaction with the interfaces, the mechanism forms an enhanced search expression.

20 Claims, 10 Drawing Sheets

U.S. PATENT DOCUMENTS

| | | | | |
|---|---|---|---|---|
| 6,629,097 | B1* | 9/2003 | Keith | 707/5 |
| 2002/0161752 | A1* | 10/2002 | Hutchison | 707/3 |
| 2003/0217335 | A1* | 11/2003 | Chung et al. | 715/514 |
| 2004/0220926 | A1* | 11/2004 | Lamkin et al. | 707/3 |
| 2004/0267739 | A1* | 12/2004 | Dowling | 707/3 |
| 2005/0289168 | A1* | 12/2005 | Green et al. | 707/101 |

OTHER PUBLICATIONS

Efthimis N. Efthimiadis, "Query Expansion", 1996, Annual Review of Information Systems and Technology (ARTIST), v31, pp. 121-187.*

Crestani et al., "Design of a Graphical User Interface for Focussed Retrieval of Structured Documents", Proceedings Eighth Symposium on String Processing and Information Retrieval, pp. 246-249, Published: Los Alamitos, CA, USA, 2001.

Meng et al., "Personalize Web Search Using Information on Client's Side", Fifth International Conference for Young Computer Scientists. ICYCS'99. Advances in Computer Science and Technology, Pt. vol. 2, pp. 985-992, vol. 2, Published: Beijing, China, 1999, 2 vol.

Blair, D., "The Data-Document Distinction in Information Retrieval", Communications of the ACM, vol. 27, No. 4, Apr. 1984, pp. 369-374.

Smith et al., "Knowledge-Based Search Tactics for an Intelligent Intermediary System", ACM Transactions on Information Systems, vol. 7, No. 3, Jul. 1989, pp. 246-270.

IBM Research Disclosure 451124, "Datamodel for Fast Access of Context of Textual Data", Nov. 2001, p. 1941.

* cited by examiner

METHOD, APPARATUS, AND PROGRAM FOR REFINING SEARCH CRITERIA THROUGH FOCUSING WORD DEFINITION

BACKGROUND OF THE INVENTION

1. Technical Field

The present invention relates to data processing and, in particular, to search engines. Still more particularly, the present invention provides a method, apparatus, and program for refining search criteria through focusing word definitions.

2. Description of Related Art

A search engine is software that searches for data based on some criteria. Search engines have become very popular and sometimes even necessary tools for locating information on the World Wide Web. Every Web search site uses a search engine that it has either developed itself or has purchased from a third party. Search engines can differ dramatically in the way they find and index the material in a data store, and the way they search the indexes from the user's query. The terms "search engine" and "Web search site" are sometimes used synonymously, although the former technically describes the software and methodology used, while the latter refers to the site itself.

Search criteria submitted to search engines are normally subject to interpretation. Typically, in a Web search engine, search criteria is submitted by a user as a simple search expression. While search engines exist that are able to process complex Boolean expressions, the average user of a Web browser does not know the proper syntax to take advantage of the more sophisticated search engines. Therefore, most Internet search engines receive search expressions with strings of words and use an "OR" as a default operator between words. Other search engines may use an "AND" operator or use weighting mechanisms to rank search results.

Other advanced search engines are able to process natural language expression. Natural language expressions allow the user to form search criteria in a human understandable format. However, the natural language expression is ultimately converted into a syntax that can be processed by the search engine and the resulting search is not necessarily more defined.

Some searches are intended to narrow results down to a single page or a finite few pages. These types of searches are looking for a "right answer." An ideal situation involves entering the magical combination of search terms that returns exactly one Web page that has the desired information. Other searches may seek to compile a set of pages pertaining to some criteria. If the search expression is too limited, many pertinent pages may be left unfound. Therefore, the searcher may wish to expand or enhance the search, rather than narrow the search. However, most search engines provide little or no assistance in focusing a search expression to achieve either goal.

Therefore, it would be advantageous to provide an improved mechanism for refining and enhancing search criteria.

SUMMARY OF THE INVENTION

The present invention provides a search engine that includes a refinement mechanism. The search engine receives and parses a search expression and delimits the expression into individual terms or words. The refinement mechanism includes a directory of synonyms, antonyms, associated terms, and other related terms. The refinement mechanism may also include a directory of compound terms and a hierarchical data structure of refinement terms. The mechanism then identifies related terms for the individual terms in the search expression, compound terms that may be formed from individual terms in the expression, and terms in the expression that have sub structures or "sub trees" in the hierarchical data structure. An interface is generated to present to the user the identified related terms, compound terms, and refinement terms in a tree structure with the search expression serving as a trunk and enhancement terms for each word or term in the search expression serving as branches. Based upon user interaction with the interface, the mechanism forms a refined or enhanced search expression.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
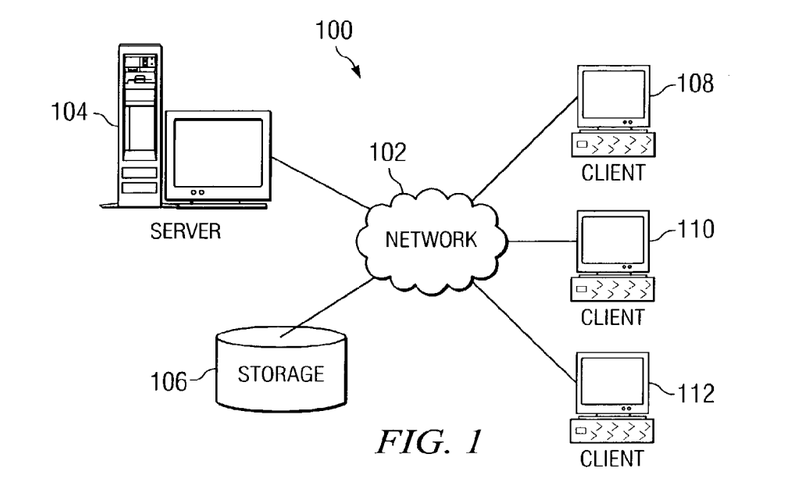
FIG. 1 depicts a pictorial representation of a network of data processing systems in which the present invention may be implemented.

With reference now to the figures, FIG. 1 depicts a pictorial representation of a network of data processing systems in which the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, server 104 is connected to network 102 along with storage unit 106. In addition, clients 108, 110, and 112 are connected to network 102. These clients 108, 110, and 112 may be, for example, personal computers or network computers. In the depicted example, server 104 provides data, such as boot files, operating system images, and applications to clients 108-112. Clients 108, 110, and 112 are clients to server 104. Network data processing system 100 may include additional servers, clients, and other devices not shown.

In the depicted example, network data processing system 100 is the Internet with network 102 representing a worldwide collection of networks and gateways that use the TCP/IP suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention.

In a preferred embodiment of the present invention, a search engine is provided that includes a refinement mechanism. The refinement mechanism includes a directory of related terms, a directory of compound terms, and a hierarchical data structure of refinement definitions of terms. The mechanism then identifies related terms, such as synonyms, antonyms, associated terms, and alternate spellings, for individual terms in the search expression. The mechanism also identifies compound terms that may be formed from individual terms in the expression and terms in the expression that have sub structures or "sub trees" in the hierarchical data structure.

Related terms, compound terms, and nodes in the refinement trees may be represented by selectable controls, such as hyperlinks, drop-down box items, or menu items. In a preferred embodiment of the present invention, the enhancement interface is in the form a tree, where the search expression forms the trunk of the tree and the enhancement terms for each word or term in the search expression form branches. Based upon user selection of these controls in the interfaces, the mechanism forms a refined search expression. A search expression may be a search query for searching documents in a data store, files throughout a network, or documents or files stored throughout the Internet. Alternatively, a search expression may also be a series of search terms used in a document profile for a document.

In a preferred embodiment of the present invention, the search engine is embodied on server 104, which may store registered search entries or may search World Wide Web servers (not shown) on the Internet. Search queries may be submitted from clients 108-112 using a Web browser. Server 104 may also include a Web server application to allow the interfaces to be presented to the user through the Web browser client application. Thus, a user may refine the search and form a more effective search expression through interaction with the interfaces.

Figure 2:
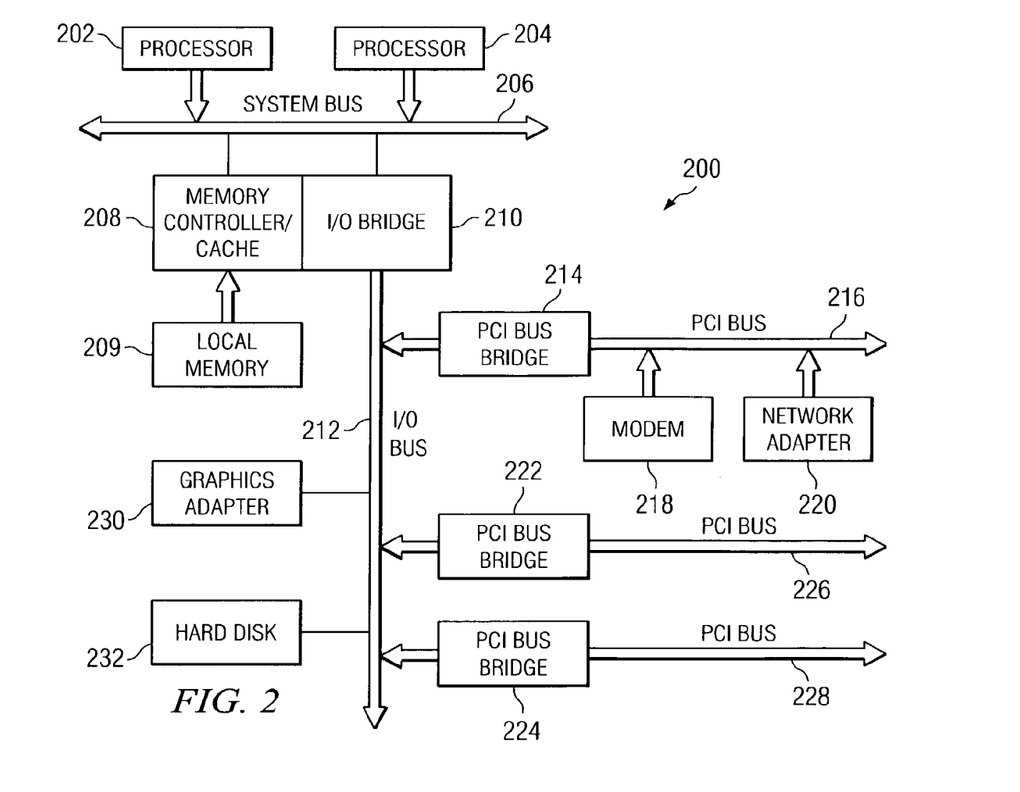
FIG. 2 is a block diagram of a data processing system that may be implemented as a server in accordance with a preferred embodiment of the present invention.

Referring to FIG. 2, a block diagram of a data processing system that may be implemented as a server, such as server 104 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support four PCI expansion slots or add-in connectors. Communications links to clients 108-112 in FIG. 1 may be provided through modem 218 and network adapter 220 connected to PCI local bus 216 through add-in boards.

Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM e-Server pSeries system, a product of International Business Machines Corporation in Armonk, New York, running the Advanced Interactive Executive (AIX) operating system or LINUX operating system.

Figure 3:
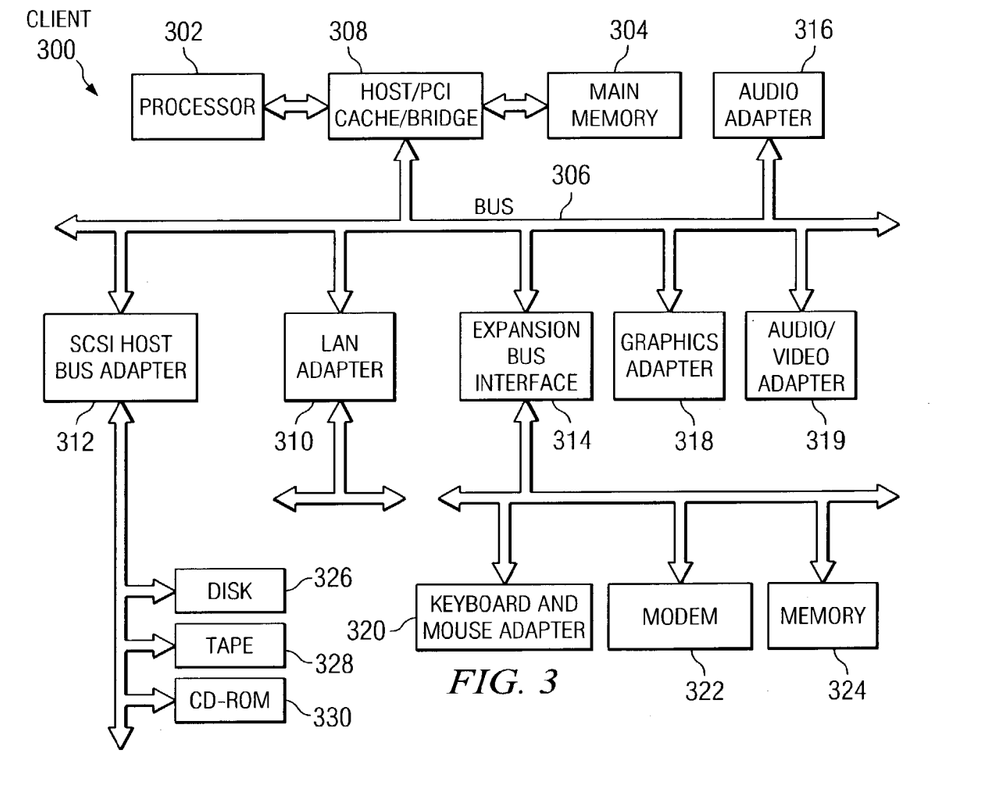
FIG. 3 is a block diagram illustrating a data processing system in which the present invention may be implemented.

With reference now to FIG. 3, a block diagram illustrating a data processing system is depicted in which the present invention may be implemented. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. Small computer system interface (SCSI) host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as Windows 2000, which is available from Microsoft Corporation. An object oriented programming system such as Java may run in conjunction with the operating system and provide calls to the operating system from Java programs or applications executing on data processing system 300. "Java" is a trademark of Sun Microsystems, Inc. Instructions for the operating system, the object-oriented operating system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash ROM (or equivalent nonvolatile memory) or optical disk drives and the like, may be used in addition to or in place of the hardware depicted in FIG. 3. Also, the processes of the present invention may be applied to a multiprocessor data processing system.

As another example, data processing system 300 may be a stand-alone system configured to be bootable without relying on some type of network communication interface, whether or not data processing system 300 comprises some type of network communication interface. As a further example, data processing system 300 may be a personal digital assistant (PDA) device, which is configured with ROM and/or flash ROM in order to provide non-volatile memory for storing operating system files and/or user-generated data.

The depicted example in FIG. 3 and-above-described examples are not meant to imply architectural limitations. For example, data processing system 300 also may be a notebook computer or hand held computer in addition to taking the form of a PDA. Data processing system 300 also may be a kiosk or a Web appliance.

Figure 4:
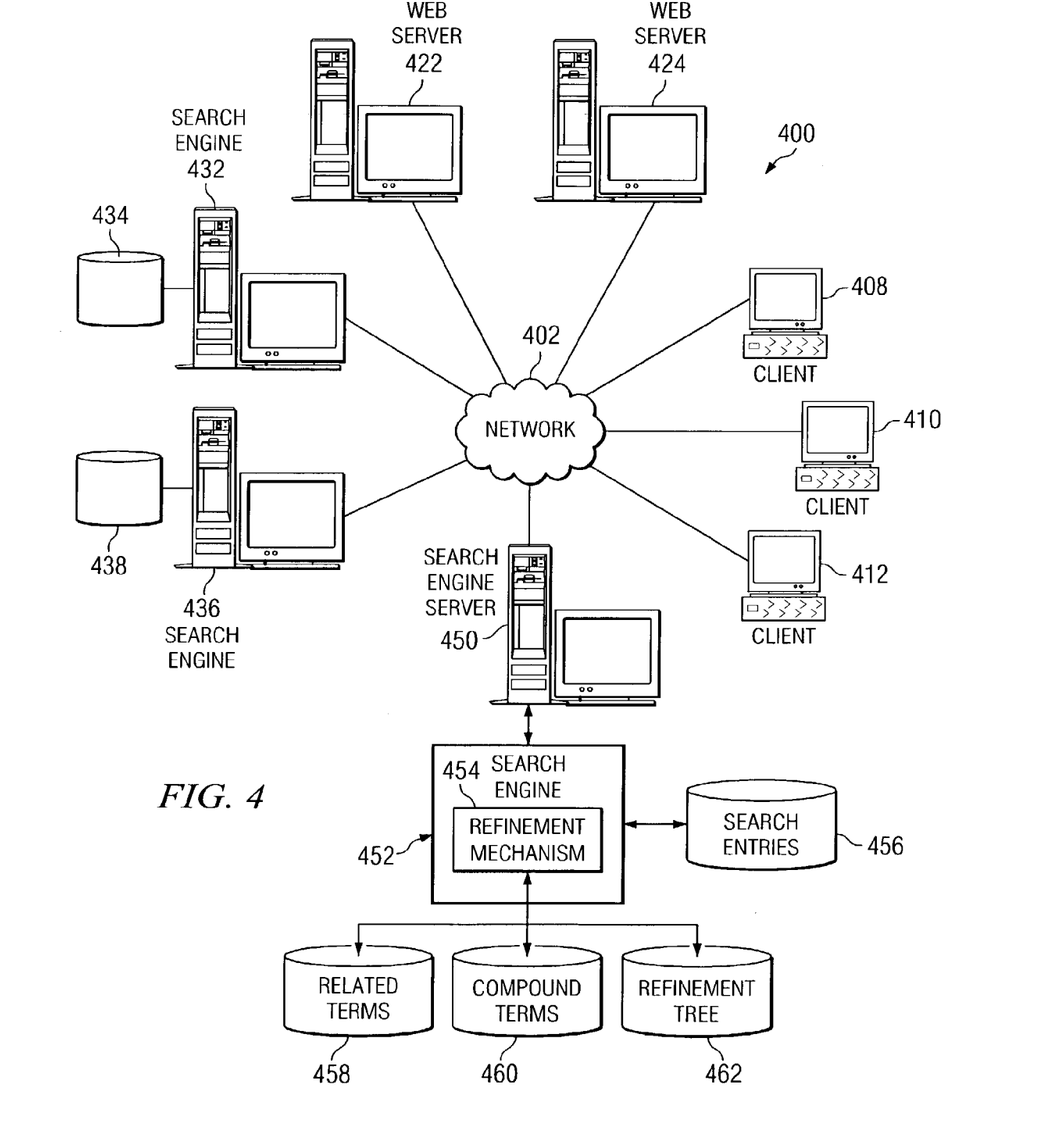
FIG. 4 is a network of data processing systems including a refinement search engine in accordance with a preferred embodiment of the present invention.

With reference to FIG. 4, a network of data processing systems is shown including a refinement search engine in accordance with a preferred embodiment of the present invention. Network data processing system 400 is a network of computers in which the present invention may be implemented. Network data processing system 400 contains data processing systems connected to network 402, which is the medium used to provide communications links between various devices and computers connected together within network data processing system 400.

In the depicted example, Web servers 422, 424 are connected to network 402. In addition, clients 408, 410, and 412 are connected to network 402. These clients 408, 410, and 412 may be, for example, personal computers or network computers. In the depicted example, Web servers 422, 424 provide data, such as HyperText Markup Language (HTML) documents, dynamic information, and applications to clients 408-412. Network data processing system 400 may include additional servers, clients, and other devices not shown.

In the depicted example, network data processing system 400 is the Internet with network 402 representing a worldwide collection of networks and gateways that use the TCP/IP suite of protocols to communicate with one another. At the heart of the Internet is a backbone of high-speed data communication lines between major nodes or host computers, consisting of thousands of commercial, government, educational and other computer systems that route data and messages. Of course, network data processing system 400 also may be implemented as a number of different types of networks, such as for example, an intranet, a local area network (LAN), or a wide area network (WAN). FIG. 4 is intended as an example, and not as an architectural limitation for the present invention.

Network data processing system 400 also includes search engines 432, 436. Web search engines may receive search queries from clients, such as clients 408-412, and search Web servers, such as Web servers 422, 424, for documents or files that satisfy the queries. The results may be returned to the requesting clients with hyperlinks to the actual information.

Authors or owners of documents on Web servers may register with Web search engines by providing a document profile including information such as, for example, a document title, description, Uniform Resource Locator (URL), and keywords. The document profiles may be stored in a search entry storage, such as storage 434 for search engine 432 and storage 438 for search engine 436. When a search query is submitted to, for example, search engine 432, the search engine may quickly search the document profiles in storage 434. The search engine may then dynamically generate a results page and return the results page to the requesting client.

In accordance with a preferred embodiment of the present invention, search engine Web server 450 has search engine 452, which may reside on the same or a different machine. Search engine 452 may perform searches by locating relevant documents in search entries 456, storage 434, 438, or by searching Web servers 422, 424. The search engine may then generate a results page and return the results page to the requesting client.

Search engine 452 includes refinement mechanism 454. The search engine receives and parses a search expression and delimits the expression into individual terms or words. The refinement mechanism includes a directory of related terms 458 and a directory of compound terms 460. Related terms include, for example, synonyms, antonyms, associated terms, and alternate spellings.

Synonyms and alternate spellings may be used in conjunction with an original search term to broaden a search. Alternatively, a synonym or alternate spelling may be used in place of an original search term to refocus the search. There are also cases where antonyms, in conjunction with the Boolean operator "NOT," may be extremely effective for refining searches. For example, a searcher may be interested in "cheap airline flights." Antonyms for "cheap" might include "expensive," "premium," and "valuable." Thus, "NOT expensive," "NOT premium," and "NOT valuable" might represent other ways to refine or enhance the search.

Associated terms are another way of expanding search results. If a search appears to be off the mark, associated terms may be useful to focus the search. For example, the searcher may be looking for stock market information. A search expression including the terms "trading stock" might return results associated with baseball cards and stock car racing. However, associated terms like "securities," "brokers," and "investing" may focus the search to achieve more pertinent results.

Refinement mechanism 454 then identifies related terms and compound terms that may be formed from individual terms in the expression. The refinement mechanism also includes a hierarchical data structure 462 of refinement terms. The mechanism then identifies terms in the expression that have sub structures or "sub trees" in the hierarchical data structure. The refinement mechanism may then generate an interface to allow the user to select a term to define. The interface may be an HTML page with hyperlinks for each related term, compound term, or refinement term. Preferably, the interface may be in the form of a tree structure, where the search expression forms a trunk and the enhancement terms for each word or term in the search expression form branches. Alternatively, the interface may include drop-down boxes or menus including the enhancement terms for each term in the search expression. A menu may be presented in response to a mouseover or right-click being performed by the user at the client. A branch includes every possible focusing word definition, including related terms. Based upon user interaction with the interfaces, the mechanism forms a refined search expression.

In a preferred embodiment, a search expression is a search query for searching documents in a data store, files throughout a network, or documents or files stored throughout the Internet. Alternatively, a search expression may be a series of search terms used in a document profile for a document, such as those stored in search entry storage 434, 438, 456.

FIGS. 5A-5G illustrate example screens of display 25 for a refinement search engine in accordance with a preferred embodiment of the present invention. Particularly, with reference to FIG. 5A, The screen comprises browser window 500, including a title bar, which may display the name of the application program. 30 Browser window 500 also includes a menu bar 502. Menus to be selected from menu bar 502 may include "File," "Edit," "View," "Insert," "Format," "Tools," "Window," and "Help." However, menu bar 502 may include fewer or more menus, as understood by a person of ordinary skill in the art. The browser window also includes a tool bar 504 including buttons for performing Web browser functions.

The browser window display area presents a search engine Web page retrieved from the search engine server. The search engine Web page includes a field 506 into which a search expression may be entered. In the example shown in FIG. 5A, a search expression "football trading cards" is entered into the search expression field. "Search" button 508 may be selected to submit the search expression to the server.

Figure 5A:
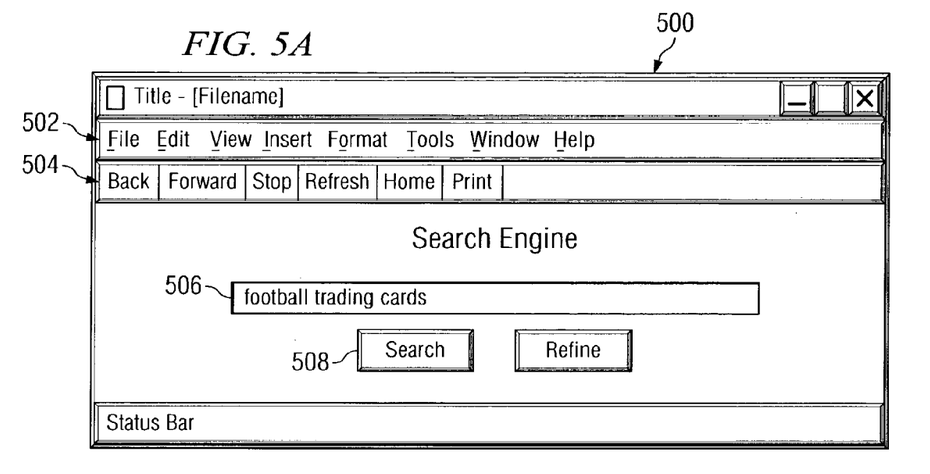
FIGS. 5A-5G illustrate example screens of display for a refinement search engine in accordance with a preferred embodiment of the present invention.
Figure 5B:
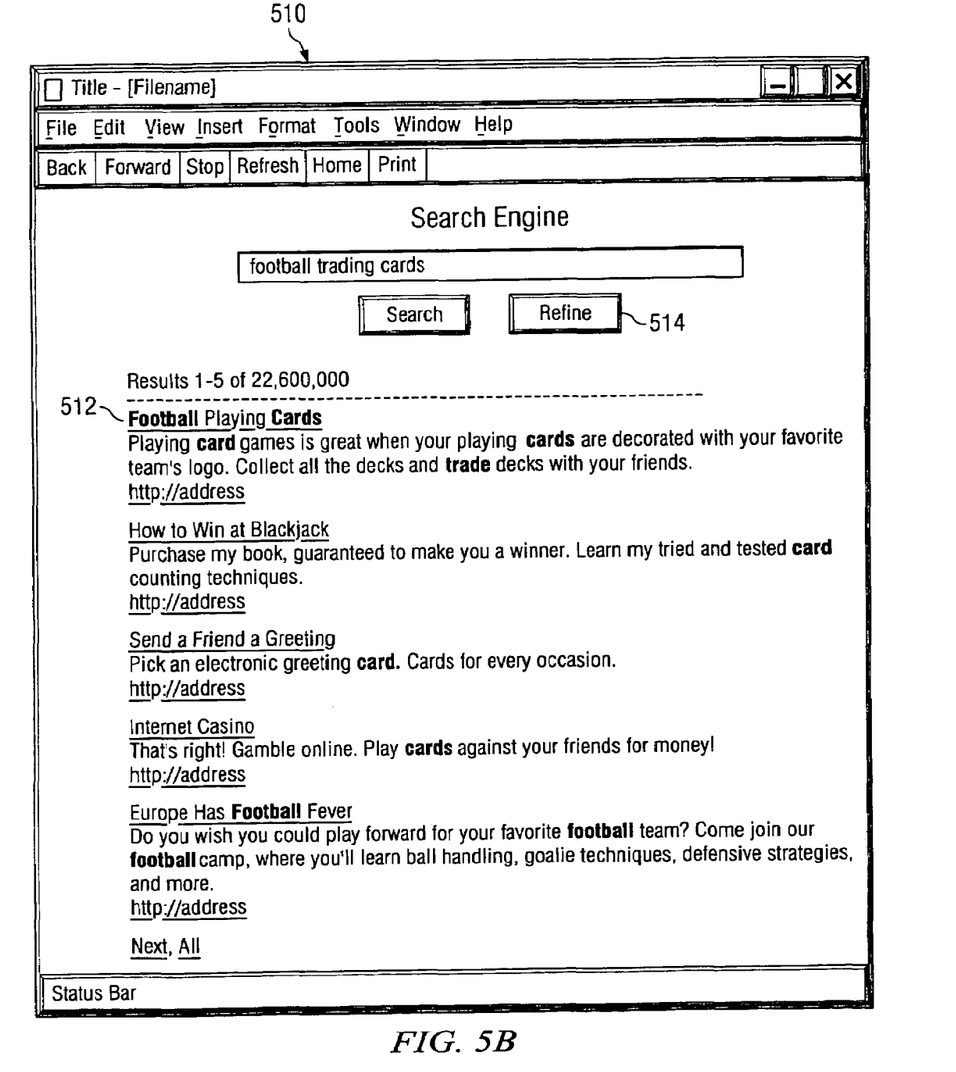

With reference now to FIG. 5B, browser window 510 presents a results page enumerating the results 512 of the search. The search expression "football trading cards," which may be converted to a Boolean expression "football OR trading OR cards" by the search engine, for example. As can be seen in the example in FIG. 5B, such a vague search expression can result in a large number of matches.

Figure 5C:
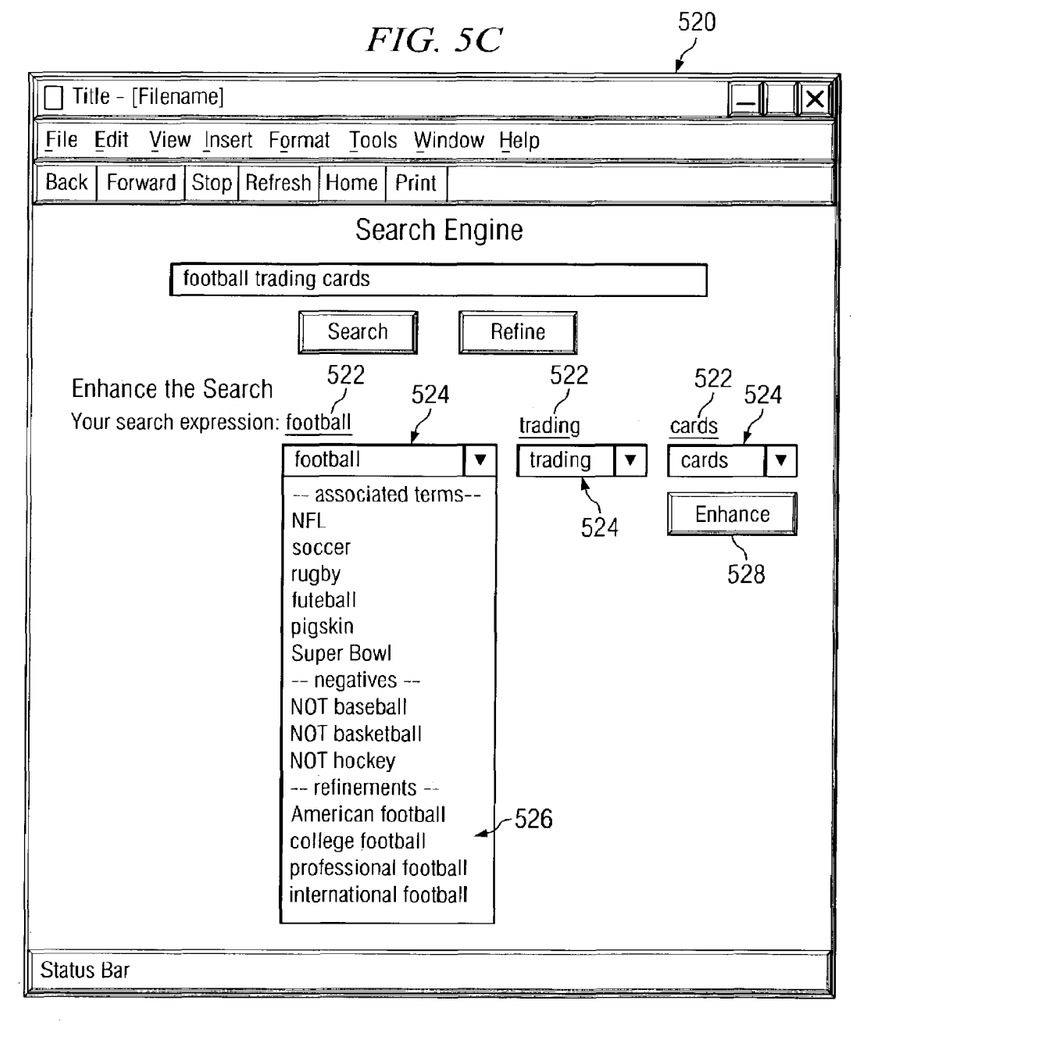

However, due to the indefinite nature of the search expression, the matches can be irrelevant if not abundant. The user may edit the search expression to refine the search; however, the user may not have enough knowledge of syntax or appropriate search terms to effectively refine the search. In fact, unconstrained refinement by the user may actually make the search worse rather than better. In accordance with a preferred embodiment of the present invention, the results page may include "Refine" button 514, which may be selected to begin refinement of the search expression. Turning to FIG. 5C, browser window 520 presents a search enhancement page, which presents the individual search terms 522 and corresponding drop-down boxes 524. In the example shown in FIG. 5C, the drop-down box for the term "football" is selected and drop-down list 526 is presented for the selected term.

Drop-down list 526 includes "associated terms," "negatives," and "refinements." The user may select any combination of related terms, refinement terms, or compound terms, if any, from drop-down list 526. When the user is finished selecting enhancements from the drop-down list, the user may select a drop-down box for another term or select "Enhance" button 528 to reform the search expression.

The refinement mechanism may be configured to add synonyms, antonyms (negatives), associated terms, or refinements to the search expression, such as by performing an "OR" operation between the actual search term and the enhancement terms. For example, the user may determine that many search results are concerned with baseball cards. In this case, the user may select "NOT baseball" to be combined with "football." The user may also select an associated term, such as "NFL," or a refinement, such as "professional football," to enhance the search expression. The interface may also be modified to give the user the option of replacing the term or adding the enhancement term to the expression.

Figure 5D:
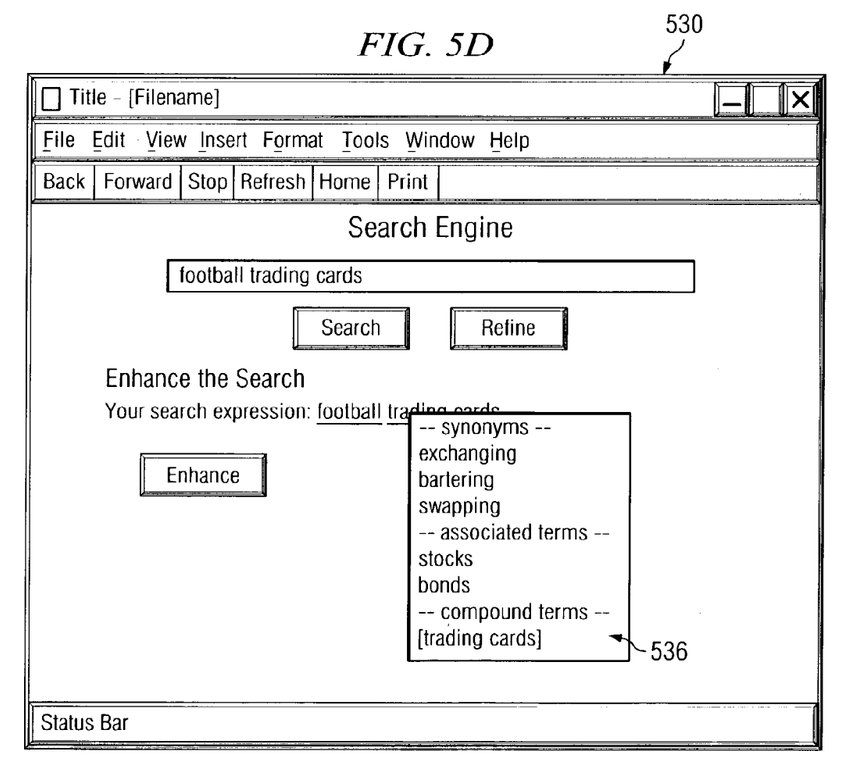

Turning next to FIG. 5D, browser window 530 presents an enhancement page, which presents the individual terms "football," "trading," and "cards." In the example shown in FIG. 5D, menu 536 is presented responsive to the user selecting the term "trading." A term may be selected in a variety of ways, such as using a mouse pointer. In a preferred embodiment of the present invention, a term is selected by a "mouseover" or right-click. A mouseover is performed by simply placing the mouse cursor over the term. A right-click is performed by placing the mouse cursor over the term and manipulating the right mouse button.

Menu 536 includes "synonyms," "associated terms," and "compound terms." Once the menu is presented, the user may select an enhancement term from the list. For example, the user may select the compound term "[trading cards]" to replace the individual terms "trading" and "cards." The refinement mechanism may also be configured to add the compound term to the search expression, such as by performing an "OR" operation between the actual search term and the compound term. The interface may also be modified to give the user the option of replacing the term or adding the compound term to the expression.

Figure 5E:
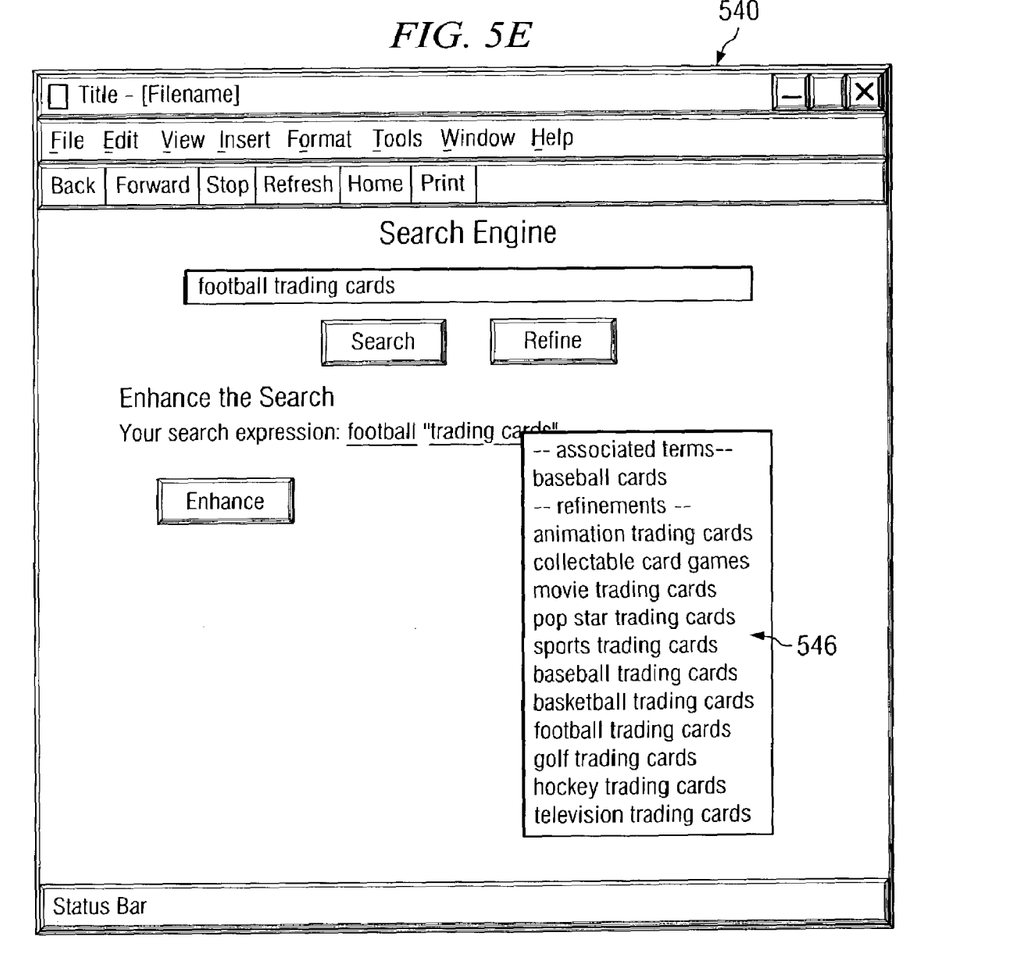

With reference now to FIG. 5E, browser window 540 presents an enhancement page, which presents the individual term "football" and the compound term "trading cards." Menu 546 is presented in response to the user selecting the compound term "trading cards." In this manner, the search expression may be refined iteratively. In other words, the user may select an enhancement for a search term and then be presented with an interface to enhance or refine the enhanced term.

In the example shown in FIG. 5E, the menu includes "associated terms" and "refinements." The refinements are selected from a hierarchical refinement data structure. For example, a sub tree for the term "trading cards" includes selections for more specific instances of the term "trading cards," such as, for example, "movie trading cards" and "sports trading cards."

Furthermore, the "sports trading cards" node in the data structure may include a sub tree that includes "baseball trading cards," "basketball trading cards," "football trading cards," "golf trading cards," and "hockey trading cards." The entirety of the subtree may be presented in the list in menu 546. Alternatively, menu 546 may show the hierarchy, such as by indentation. In another embodiment, the menu may show only the "sports trading cards" item. The user may then traverse the hierarchical structure iteratively by selecting the newly refined term "sports trading cards."

Figure 5F:
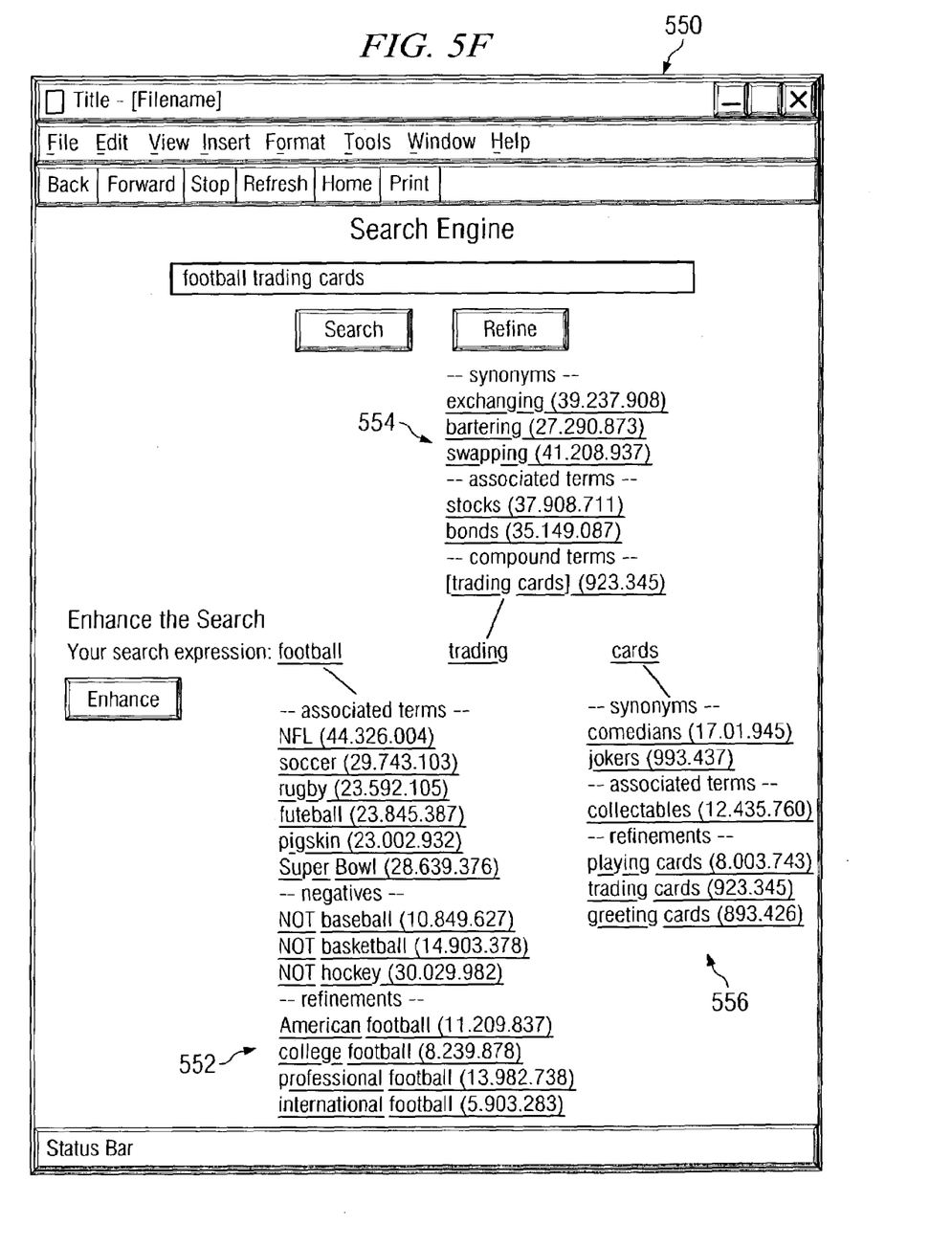

With reference to FIG. 5F, browser window 550 presents an enhancement page, which presents the individual terms "football," "trading," and "cards," as a trunk of a tree structure, as well as enhancement terms for each term forming branches on the tree. The interface includes a branch of enhancement terms 552 for the term "football," a branch of enhancement terms 554 for the term "trading," and a branch of enhancement terms 556 for the term "cards." The enhancements are presented as branches from the individual terms, similar to the manner in which one would diagram a sentence. The enhancement terms may be presented in the interface as selectable controls, such as hyperlinks. A user may select an enhancement term and the search expression may be reformed. In this manner, the user may iteratively refine the search expression.

Furthermore, the search engine may perform a search using the enhancement terms to obtain a preliminary result. For example, the search engine may replace or add the corresponding search term in the search expression and obtain a result, such as the number of hits, the difference that may result, and the like. The results number for each enhancement term may be presented in the interface, as shown in branches 552, 554, 556. Thus, the user may determine whether to select an enhancement term by evaluating the extent to which the enhancement term broadens or narrows the search as the case may be. For example, including the term "pigskin" may broaden the search, while replacing the term "football" with "professional football" may narrow the search and replacing the individual terms "trading" and "cards" with the compound term "[trading cards]" may significantly narrow the search.

Each enhancement term may also include sub-branches or sub-trees, particularly refinement terms. For example, "professional football" may include a branch including the terms "NFL football," "NFL Europe football," "CFL football," and "Arena League football."

When an enhancement term is selected, the refinement mechanism may form a refined search expression and generate and present a new interface. Therefore, the user may iteratively refine or enhance the search expression using the refinement mechanism and interface of the present invention.

Figure 5G:
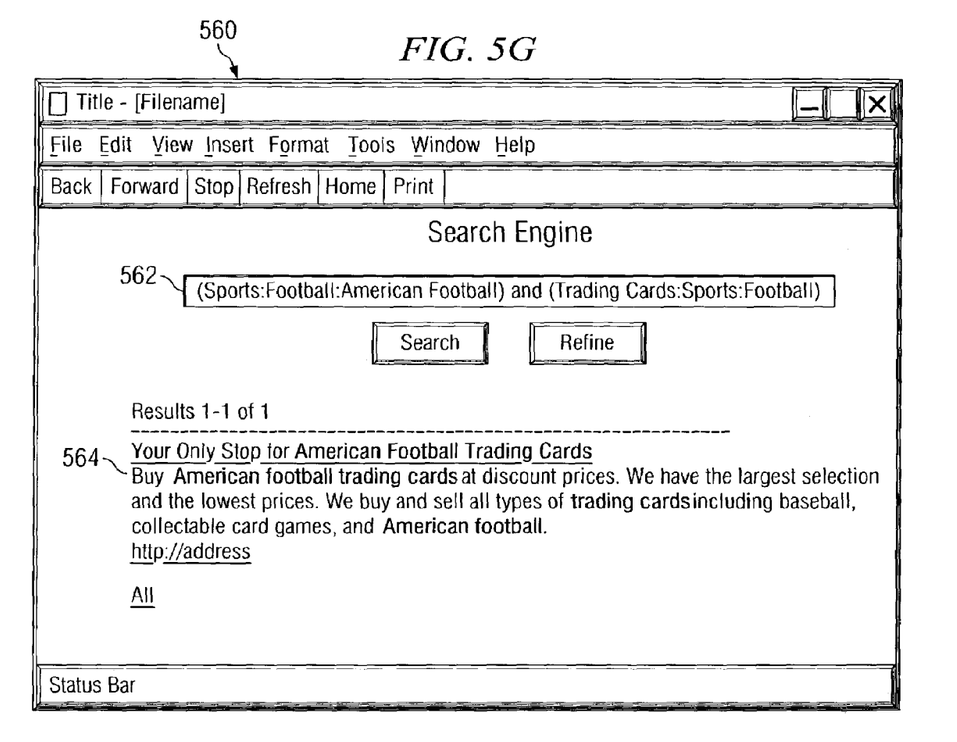

Turning now to FIG. 5G, browser window 560 presents a results page enumerating the results 564 of the refined search. As seen in this example, the search expression "football trading cards" has been converted to a refined search expression "(Football:American Football) and (Trading Cards:Sports: Football)" by the refinement mechanism, as shown in search expression field 562. Results 564 are retrieved from a search entries data storage, for example, and presented for selection by the user.

Thus, the refinement mechanism of the present invention allows users to further define search terms using a constrained interface. As such, the user is not required to learn a complicated syntax or discover effective search terms in a time consuming trial-and-error process. Furthermore, the related terms, the compound terms, and the hierarchical refinement data structure may be stored on the search engine server. Thus, this information may be updated in a central location.

Moreover, search entries for registered documents may be formed using interfaces similar to those depicted by example in FIGS. 5A-5G. Therefore, authors and owners of content on the Internet may define a search expression with search terms to more closely match user queries. Since users are able to narrow or broaden the scope of their queries and content owners are able to further define their search terms, irrelevant information is reduced and more of the information targeted by the queries is more likely to be found. This is a benefit to both the searcher and the registered content owner.

Figure 6:
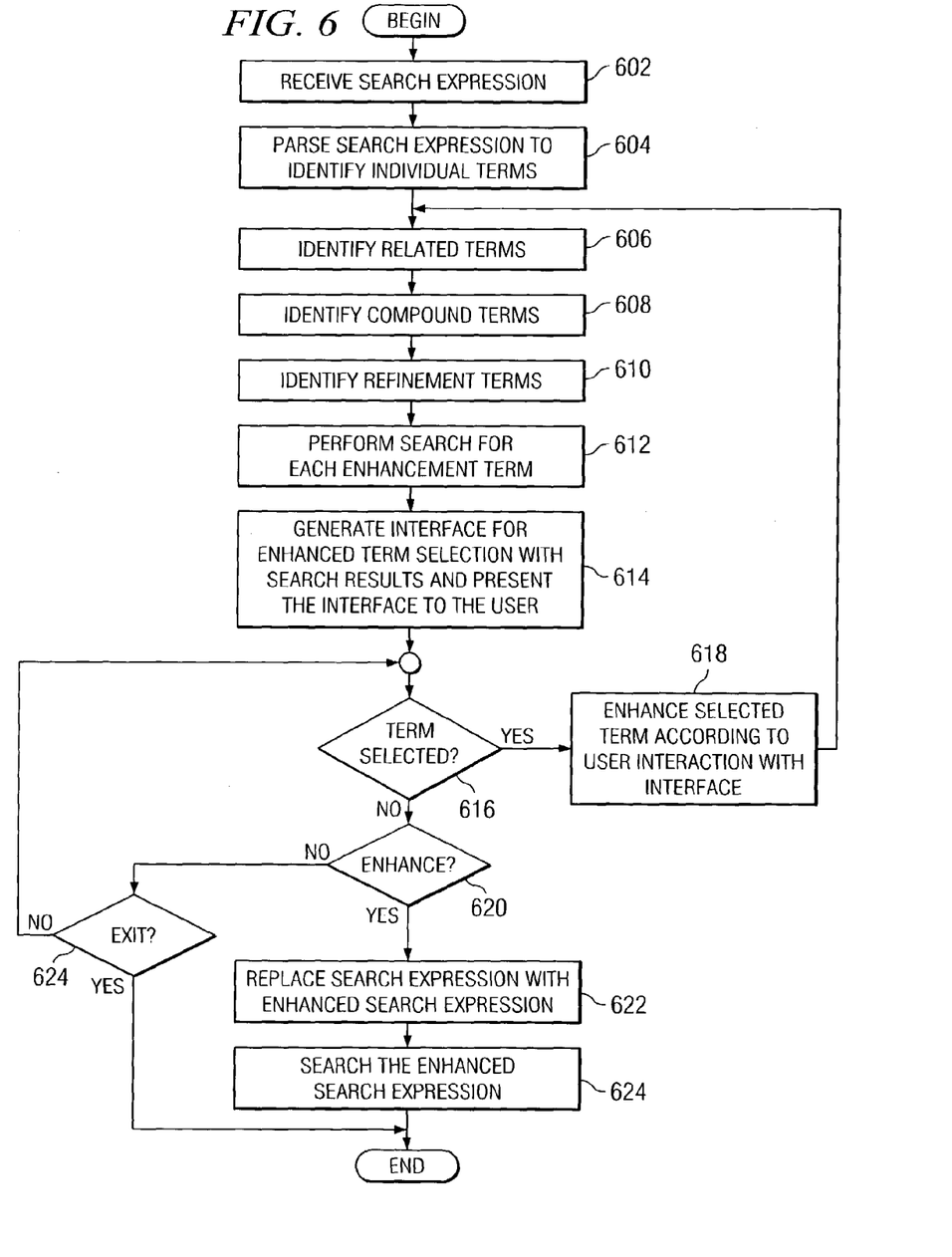
FIG. 6 is a flowchart illustrating the operation of a refinement mechanism in accordance with a preferred embodiment of the present invention.

With reference now to FIG. 6, a flowchart illustrating the operation of a refinement mechanism is shown in accordance with a preferred embodiment of the present invention. The process begins, receives a search expression (step 602), and parses the search expression to identify individual search terms (step 604). Next, the process identifies related terms (step 606), identifies compound terms (step 608), and identifies refinement terms (step 610) for each individual search term in the search expression.

Thereafter, the process performs a search for each identified enhancement term (step 612), including related terms, compound terms, and refinement terms. The process then generates an interface for enhanced term selection with search results from step 612 and presents the interface to the user (step 614).

Next, a determination is made as to whether an enhancement term is selected (step 616). A term may be selected, for example, by selecting a hyperlink for the enhancement term. If an enhancement term is selected, the process enhances the selected term according to user interaction with the interface step 618 and returns to step 606 to identify enhancement terms for the enhanced term.

If a term is not selected in step 616, a determination is made as to whether an enhance option is selected (step 620). An enhance option may be selected, for example, by selecting an "Enhance" button. If an enhance option is selected, the process replaces the search expression with the enhanced search expression (step 622), searches the enhanced search expression (step 624) and ends.

If an enhance option is not selected in step 620, a determination is made as to whether an exit condition exists (step 624). An exit condition may exist, for example, when the user exits the browser, begins a new search, or navigates to a new page. If an exit condition exists, the process ends. Otherwise, the process returns to step 616 to determine whether an enhancement term is selected.

The enhanced search expression may then be used to perform a search. The enhanced search expression may also be further enhanced using the process in FIG. 6. Alternatively, the enhanced search expression may be used in a document profile for a search entry to provide terms that may be searched to locate documents that satisfy a search query.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for refining a search expression, the method comprising:

receiving, by a processor of a data processing system, a search expression including at least a first search term in a memory of the data processing system;

identifying at least a first enhancement term for the first search term;

generating an enhancement interface including the search expression forming a trunk of a graphical tree structure and a first branch of the graphical tree structure including the at least a first enhancement term associated with the first search term;

presenting the enhancement interface to a user, wherein the enhancement interface includes a preliminary result of using the at least a first enhancement term in the search expression; and responsive to receiving a selection of a given enhancement term from the first branch, forming an enhanced search expression including the given enhancement term.

2. The method of claim 1, further comprising:

performing a search for the at least a first enhancement term to receive a search result; and presenting the search result in association with the at least a first enhancement term in the first branch.

3. The method of claim 1, wherein the at least a first enhancement term is selected from the group consisting of a synonym, an antonym, an associated term, an alternate spelling.

4. The method of claim 1, wherein the search expression includes a second search term.

5. The method of claim 4, wherein the at least a first enhancement term is a compound term that is formed from the first search term and the second search term.

6. The method of claim 4, further comprising:
identifying at least a second enhancement term for the second search term, wherein the enhancement interface includes a second branch including the at least a second enhancement term associated with the second search term.

7. The method of claim 1, wherein identifying at least a first enhancement term for the first search term includes:
receiving a hierarchical data structure including a plurality of terms, wherein each term within the plurality of terms has associated therewith at least one refinement term that further defines the term;
determining whether the first search term matches one of the plurality of terms; and
responsive to the first search term matching one of the plurality of terms, identifying the at least one refinement term as the first enhancement term.

8. The method of claim 1, wherein the first branch is a list of hyperlinks, wherein each hyperlink in the list of hyperlinks represents an enhancement term.

9. The method of claim 1, wherein forming an enhanced search expression includes replacing the first search term with the given enhancement term.

10. The method of claim 1, wherein forming an enhanced search expression includes adding the given enhancement term to the search expression using an OR operator.

11. The method of claim 1, wherein forming an enhanced search expression includes adding the given enhancement term to the search expression using a NOT operator if the given enhancement term is an antonym.

12. An apparatus for refining a search expression, the apparatus comprising:
receipt means for receiving, by a processor of a data processing system, a search expression including at least a first search term in a memory of the data processing system;
identification means for identifying at least a first enhancement term for the first search term;
interface means for generating an enhancement interface including the search expression forming a trunk of a graphical tree structure and a first branch of the graphical tree structure including the at least a first enhancement term associated with the first search term;
presentation means for presenting the enhancement interface to a user, wherein the enhancement interface includes a preliminary result of using the at least a first enhancement term in the search expression; and
enhancement means, responsive to receiving a selection of a given enhancement term from the first branch, for forming an enhanced search expression including the given enhancement term.

13. The apparatus of claim 12, further comprising:
performance means for performing a search for the at least a first enhancement term to receive a search result; and
second presentation means for presenting the search result in association with the at least a first enhancement term in the first branch.

14. The apparatus of claim 12, wherein the at least a first enhancement term is selected from the group consisting of a synonym, an antonym, an associated term, an alternate spelling.

15. The apparatus of claim 12, wherein the search expression includes a second search term.

16. The apparatus of claim 15, wherein the at least a first enhancement term is a compound term that is formed from the first search term and the second search term.

17. The apparatus of claim 15, further comprising:
second identification means for identifying at least a second enhancement term for the second search term, wherein the enhancement interface includes a second branch including the at least a second enhancement term associated with the second search term.

18. The apparatus of claim 12, wherein the identification means includes:
second receipt means for receiving a hierarchical data structure including a plurality of terms, wherein each term within the plurality of terms has associated therewith at least one refinement term that further defines the term;
determination means for determining whether the first search term matches one of the plurality of terms; and
second identification means, responsive to the first search term matching one of the plurality of terms, for identifying the at least one refinement term as the first enhancement term.

19. A computer program product, stored in a computer readable storage medium, for refining a search expression, the computer program product comprising:
instructions for receiving a search expression including at least a first search term;
instructions for identifying at least a first enhancement term for the first search term;
instructions for generating an enhancement interface including the search expression forming a trunk of a graphical tree structure and a first branch of the graphical tree structure including the at least a first enhancement term associated with the first search term;
instructions for presenting the enhancement interface to a user, wherein the enhancement interface includes a preliminary result of using the at least a first enhancement term in the search expression; and
instructions, responsive to receiving a selection of a given enhancement term from the first branch, for forming an enhanced search expression including the given enhancement term.

20. The computer program product of claim 19, further comprising:
instructions for performing a search for the at least a first enhancement term to receive a search result; and
instructions for presenting the search result in association with the at least a first enhancement term in the first branch.

* * * * *